United States Patent [19]

Egan

[11] Patent Number: 4,907,880

[45] Date of Patent: Mar. 13, 1990

[54] APPARATUS FOR DETERMINING ANGULAR DEVIATION OF AN ARTICLE

[75] Inventor: Richard G. Egan, Dover, Mass.

[73] Assignee: Polaroid Corporation, Cambridge, Mass.

[21] Appl. No.: 770,987

[22] Filed: Aug. 30, 1985

[51] Int. Cl.[4] ............................................. G01B 11/00
[52] U.S. Cl. .................................................... 356/151
[58] Field of Search ............... 356/152, 138, 150, 151, 356/389, 392, 394, 71

[56] References Cited

U.S. PATENT DOCUMENTS

| | | | |
|---|---|---|---|
| 3,762,819 | 10/1973 | Myer | 356/151 |
| 3,947,128 | 3/1976 | Weinberger | 356/394 |
| 4,443,855 | 4/1984 | Bishop et al. | 364/513 |
| 4,457,664 | 7/1984 | Judell et al. | 414/779 |
| 4,575,637 | 3/1986 | Sillivan | 356/394 |

*Primary Examiner*—Richard A. Rosenberger
*Attorney, Agent, or Firm*—John S. Vale

[57] ABSTRACT

An apparatus is provided for determining the angular deviation of a randomly angular oriented article from a desired angular orientation in preparation for its engagement by a robotic part handling device. The apparatus projects a rotating image of the article onto a mask which is representative of the article in a desired orientation and provides an angular deviation signal indicative of the cummulative angular displacement of the image from an initial reference position at which the image matches the mask.

16 Claims, 4 Drawing Sheets

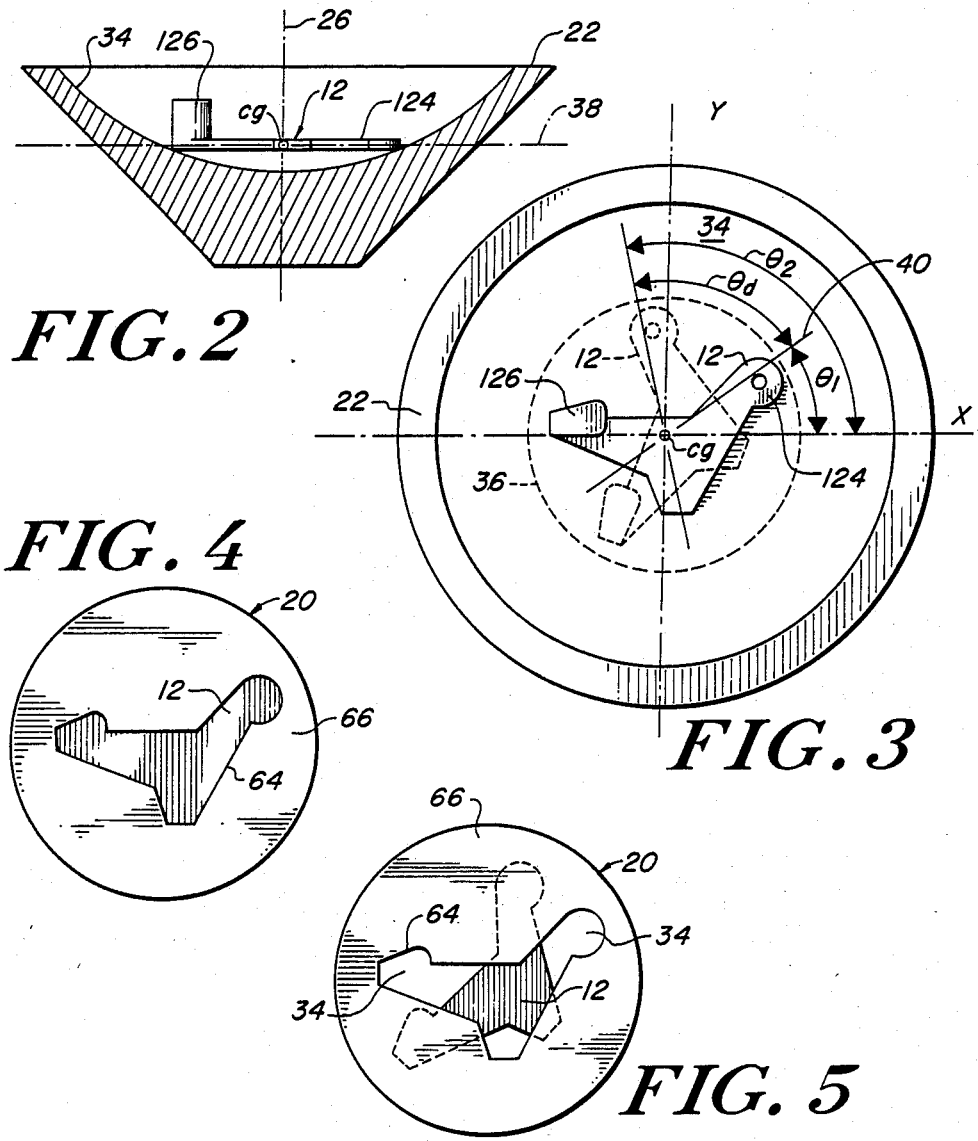
*FIG. 2*
*FIG. 4*
*FIG. 3*
*FIG. 5*
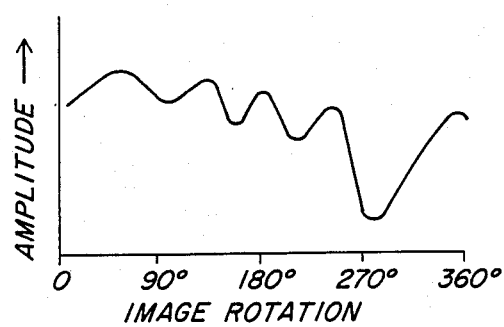
*FIG. 6*

APPARATUS FOR DETERMINING ANGULAR DEVIATION OF AN ARTICLE

BACKGROUND OF THE INVENTION

The present invention relates to the field of automated manufacturing apparatus and, more particularly, to apparatus for determining the angular orientation of an article, such as a piece part of a product assembly, in preparation for its engagement by a robotic part handling device.

In the interest of improving efficiency and reducing costs, programmable robotic part handling devices are being incorporated into automated product assembly lines. In one type of assembly operation such a robotic device is assigned a task of grasping a part provided at a pick-up station and transferring it to its proper position on the assembly.

In order for the robotic device to successfully locate and grasp the part, its operating program must have, or be supplied with, data specifying the position and angular orientation of the part at the pick-up station. Typically, the robotic device is preprogrammed for a predetermined part position and angular orientation which requires that the part be accurately located at the pick-up station.

One approach to accurate part location is to provide a dedicated part positioning apparatus that is specifically designed to manipulate and feed a particular part into the pick-up station. However, this approach is not very cost effective because in the event of a major change in the structure of the part, or a shift to a new product, the dedicated device generally is rendered obsolete and must be replaced.

A more flexible approach involves the use of a generic type of part positioning apparatus that is easily adapted to handle a variety of different types of parts. Such apparatus generally comprise a mechanism for receiving a randomly disposed part and manipulating it to achieve the desired position and orientation; an electronic vision system for viewing the part and providing signals indicative of its position and orientation; and a control system responsive to these signals for operating the part manipulation device.

One type of part manipulation device includes a moveable part supporting X-Y stage that is mounted on a turntable for rotation about a vertical axis. In response to inputs from the vision system, the stage is moved along X and Y axes to accurately position the part in a designated area of a horizontal plane centered on the vertical axis about which the turntable rotates. Once the part is so positioned, the vision system operates in an angular orientation mode and provides signals which are utilized to effect rotation of the turntable to achieve the desired angular orientation which is specified by a polar coordinate angle $\theta$. For a representative example of this type of generic part positioning apparatus, see U.S. Pat. No. 4,457,664.

While the above noted part positioning apparatus does provide the flexibility of being able to handle a variety of different parts, it does have drawbacks. The moveable X-Y stage tends to be rather expensive and slow in terms of the time required to accurately position a part in the X-Y plane. Also, because the positioning apparatus has to both position and angularly orient the part, it generally requires the employment of a complex and expensive vision system. Typically, the vision system utilizes pattern recognition or template matching schemes which require the generation and processing of large amounts of data to achieve the desired results. Consequently, the part positioning and angular orientation procedure is relatively slow and tends to have an adverse effect on production rate.

Commonly assigned copending application U.S. Ser. No. 747,841 filed by Peter E. Kane on June 24, 1985 and entitled "PART POSITIONING APPARATUS AND METHOD" discloses and claims a generic type of part positioning apparatus which eliminates the need for a moveable X-Y stage and is adapted to operate with a less sophisticated vision system because it is only involved in the angular orientation procedure and does not have to be used for X-Y positioning.

X-Y part positioning is achieved mechanically using a bowl-like part receptacle. The receptacle is mounted for rotation about a central vertical axis and is also configured to be subjected to a vibratory force directed along the vertical axis.

In response to vibrating the receptacle, a part randomly disposed on a concave interior surface of the bowl slides thereover downwardly and toward the center of the bowl, under the influence of gravity. The shape of the interior surface causes the part to assume an equilibrium position in a designated area of a horizontal plane having its center in coincidence with the central vertical axis. Thereafter, the vision system is invoked to sense the angular orientation of the part and feed this information to the control system which effects rotation of the receptacle about the vertical axis until the part supported on the interior surface is in the desired angular orientation for pick up.

Despite reducing the work load of the vision system to the angular orientation phase, commercially available vision systems suitable for this task tend to have relatively slow response times and are rather expensive.

Also, it would be desirable to have a vision system that is operative for viewing a randomly angularly oriented part and quickly providing data specifying its angular deviation from a desired orientation. The acquisition of such information provides for more flexibility in executing the part pick up scheme. That is, rather than being restricted to physically rotating the part to achieve desired orientation, the system designer now has the option of feeding this information directly to the robotic device to adjust the orientation of its part engagement member to that of the part at the pick up station.

Therefore, it is an object of the present invention to provide an apparatus for determining the angular deviation of an article from a desired angular orientation.

Another object is to provide such an apparatus that includes a vision system that is simple in its construction and has a relatively fast response time.

Yet another object is to provide such an apparatus that does not restrict achieving desired angular orientation to physically rotating the article, but rather provides the option of modifying the action of a robotic part handling device to accommodate the angular orientation of a randomly oriented article.

Other objects of the invention will, in part, be obvious and will, in part, appear hereinafter.

SUMMARY OF INVENTION

The present invention provides an apparatus for determining the angular deviation with respect to a reference axis of a randomly angularly oriented article in a given plane from a desired angular orientation.

The apparatus includes means for supporting such a randomly angularly oriented article in the given plane and optical means for forming an image of the supported article at an image plane. The optical means, for example an image inverting prism, is mounted for rotation about its optical axis through a given angular displacement from a reference location to effect a 360° rotation of the image from an initial position.

Means are provided for rotatably driving the optical means through the given angular displacement and for providing displacement signals indicative of the progressive cumulative change in angular displacement of the image from its initial position.

The rotating image is projected onto a reference pattern or mask, located in the image plane, which is representative of the article in the desired orientation. Means, including the reference pattern, are operative for providing a signal indicative of when during the course of an image rotation the image is at the desired orientation.

The apparatus additionally includes means responsive to the displacement signals and the desired orientation signal for providing an angular deviation signal indicative of the cumulative angular displacement of the image from its initial position at the occurrence of the desired orientation signal.

Once the angular deviation is determined, the article may be physically rotated to achieve the desired angular orientation in preparation for its engagement by a robotic part-handling device. Alternatively, the deviation information may be used to modify the operation of the robotic part-handling device to accommodate the angular orientation of the article.

BRIEF DESCRIPTION OF THE DRAWINGS

For a fuller understanding of the nature and objects of the present invention, reference may be had to the following detailed description taken in connection with the accompanying drawings wherein:

FIG. 2 is an elevational view, partly in section, of an article supporting member;

FIG. 3 is a plan view of the article supporting member of FIG. 2 showing the desired angular orientation of an article therein in dotted lines;

FIG. 4 is a plan view of a mask showing an image of the supported article in registration with a mask aperture whereby a minimum amount of light is transmitted through the aperture;

FIG. 5 is similar in some respects to FIG. 4 except that the image of the article is not registered with the aperture;

FIG. 6 is a graphical representation of the variation in the amplitude of light transmitted through the mask aperture as a function of image rotation;

DESCRIPTION OF THE PREFERRED EMBODIMENT

Figure 1:
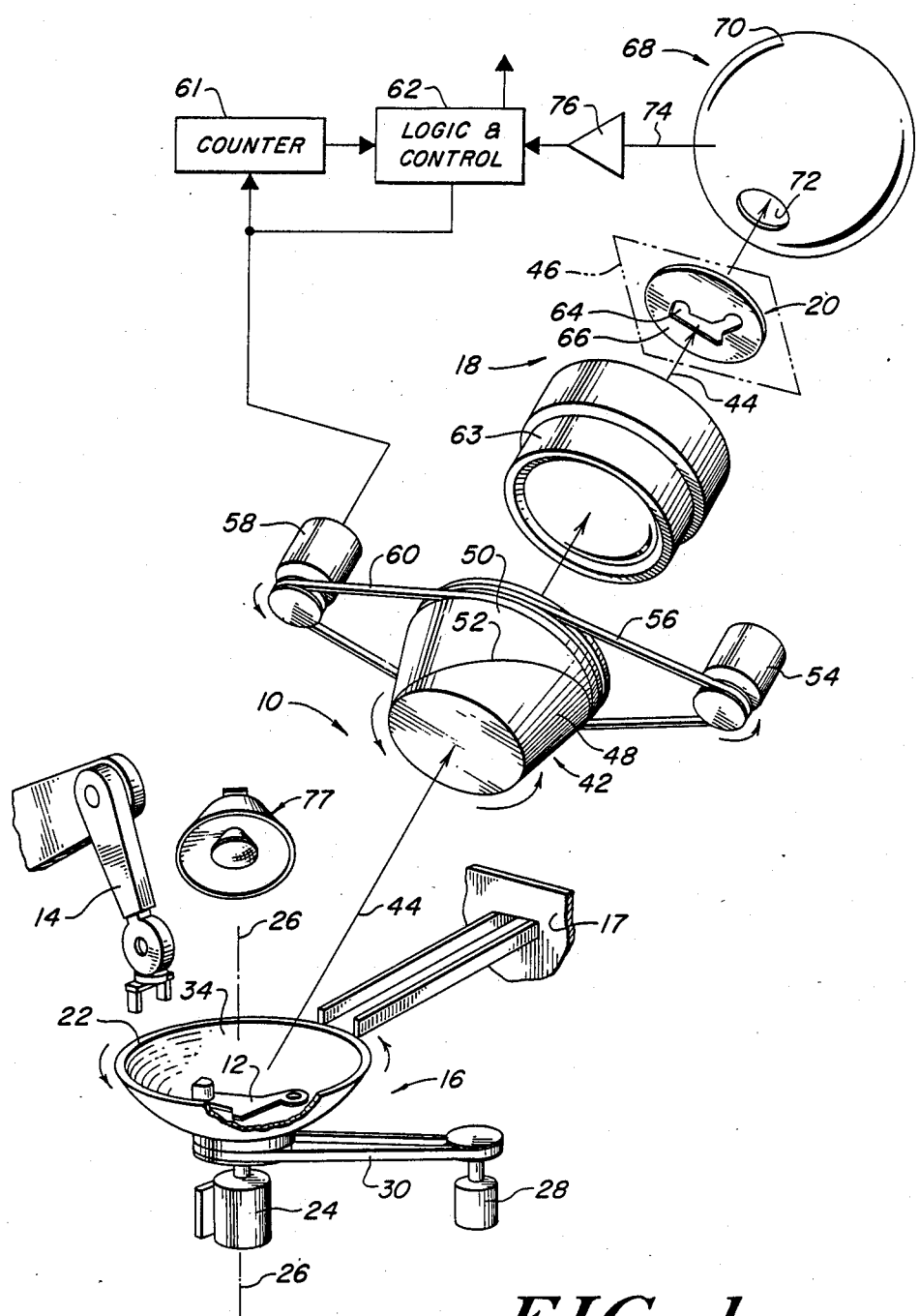
FIG. 1 is a diagrammatic perspective view of the angular deviation determining apparatus embodying the present invention.

The present invention provides an apparatus 10, diagramatically shown in FIG. 1, for determining the angular deviation with respect to a reference axis of a randomly angularly oriented article in a given plane from a desired angular orientation. A typical application for apparatus 10 is to determine the angular deviation of an article, such as a small molded piece part 12 of a product assembly, in preparation for its engagement or pick up by a conventional programmable robotic part handling device of the type that includes an articulated pick up arm, a portion of which is diagramatically represented at 14.

Major components of apparatus 10 include means for supporting a randomly angularly oriented article or part, such as the illustrated part receptacle assembly 16 which is adapted to receive parts from a part feeding device 17, and a vision system 18 for providing a rotatable image of the supported part which is projected onto a reference pattern, such as the illustrated mask 20, that is representative of part 12 in a predetermined desired angular orientation.

The receptacle assembly 16 includes a bowl-shaped part receptacle 22 which is mounted on a base unit 24 for limited up and down translation along a central vertical axis 26 in response to a vibratory force applied to receptacle 22 by a vibratory source in base unit 24. Optionally, receptacle 22 may also be mounted for rotation about axis 26 for physically rotating part 12 to achieve its desired angular orientation after determination of angular deviation. In this case, means such as a stepper motor 28 connected to the base of receptacle 22 by a drive belt 30 are provided for rotatably driving receptacle 22 about axis 26.

In addition to supporting part 12, assembly 16 serves as means for accurately positioning the part with respect to X and Y reference axis in a given horizontal plane.

With additional reference to FIGS. 2 and 3, the receptical 22 has a smooth concave interior surface 34, typically a segment of a hemisphere, that is symmetrically disposed about the central vertical axis 26. The shape of surface 34 is such that a part 12 placed thereon will tend to slide over surface 34, under the influence of gravity, downwardly and toward the center of receptical 22 and assume an equilibrium position wherein its center of gravity is as low as possible. To facilitate the sliding movement of the part toward the equilibrium position, the receptacle 22 is subjected to a vibratory force, applied from the base unit 24, which tends to minimize the friction forces between part 12 and surface 34. As a result of this procedure, part 12 becomes located within a circular designated area 36, centered on axis 26, of a given horizontal plane 38 within the confines of receptical 22.

In use, the receptacle assembly 16 is positioned with respect to the path of travel of the robotic arm 14 such that the designated area 36 within receptacle 22 is at a known X-Y location that is specified in the robot's operating program. In this manner, part 12 is accurately positioned in horizontal plane 38 with respect to X and Y reference axes having their origin on the central axis 26 as best shown in FIG. 3. However, at this point part 12 is still disposed in a random angular orientation.

The angular orientation or direction of the part 12 within the designated area 36 may be specified by an included polar coordinate angle $\theta$ between the X reference axis and an imaginery reference line 40 which lies along a selected portion of the part and passes through the origin of the X and Y axes.

The term desired angular orientation, as used herein, refers to the orientation angle $\theta$ at which the robotic device expects to fine the part for pick up or a reference orientation at which the arm is initially set and from which a wrist portion of the arm 14 may be adjusted to accommodate an angular deviation of the part from the desired orientation.

In FIG. 3 the randomly oriented part 12 is shown in solid lines at orientation angle $\theta_1$ and in dotted lines to show the desired or predetermined larger orientation angle $\theta_2$. The angular deviation of part 12 from its desired orientation is the angular difference between the two angles ($\theta_2 - \theta_1$) designated $\theta_d$.

Basically there are two ways to compensate for angular deviation determined by apparatus 10. The first is a rotate receptical 22 about axis 26 through the differential angle $\theta_d$ to physically turn part 12 and bring it into correspondence with the desired orientation shown in dotted lines. In this case, the robotic device is pro- grammed for the desired angular orientation and auto- matically moves the arm 14 into receptical 22 and grasps the part 12 which is now disposed in the expected position and orientation.

The other method leaves the part 12 as is and feeds the deviation information to the robotic device which adjusts the angular orientation of the arm 14 from a reference orientation to accommodate the specified deviation. In this case, there is no need to configure receptical 22 for rotation about axis 26. As will become apparent later, apparatus 10 will accommodate either of these two methods or a combination of both.

For a more detailed description of the structure and function of part receptacle assembly 16, reference may be had to commonly assigned copending application U.S. Ser. No. 747,841 filed on June 24, 1985 and which is incorporated by reference herein.

The vision system 18 is configured to determine angular deviation by projecting a rotatable image of the part 12 in receptacle 22 onto the fixed mask 20; rotating the image through at least 360°; and determining the cumulative angular displacement of the image from an initial reference position at which the image coincides with the mask representation of the part in its desired angular orientation.

As best shown in FIG. 1, vision system 18 includes optical means, in the form of a prism 42 mounted for rotation about its optical axis 44, for forming a rotatable image of the part 12 at a rearwardly spaced image plane 46 where mask 20 is located in alignment with axis 44.

For an optical member to provide an image that rotates in response to rotating the optical member about its optical axis, it must be of the image inverting type. In the illustrated embodiment, prism 42 is a conventional image inverting Pechan prism comprising an assemblage of cooperating forward and rear prismatic elements 48 and 50 having their respective diagonals in opposed spaced relation to define a very narrow air gap 52 therebetween. However, it should be understood that other image inverting optical means, such as a Dove prism or the like, may be substituted for the Pechan prism in vision system 18.

The image rotation characteristics of a Pechan prism are such that the image rotates at twice the angular velocity at which prism 42 is rotated about axis 44 to effect image rotation. This means that in response to rotating prism 42 through 360° the image rotates through 720°. Therefore, to rotate the image through 360° it is only necessary to rotate prism 42 through 180°.

To effect image rotation, prism 42 is adapted to be rotatably driven about axis 44 by an electrical drive motor 54 that is connected to prism 42 by a drive belt 56.

In order to determine angular deviation, it is necessary to know the cumulative angular displacement of the image from an initial reference position. This is accomplished by monitoring the rotation of prism 42 with a rotatable signal encoder or pulse generator 58 which is connected to prism 42 by a drive belt 60.

In response to being rotatably driven by prism 42, encoder 58 provides a succession of output pulse signals each of which is indicative of a predetermined incremental angular displacement of prism 42. Typically, the encoder 58 may be configured to provide a pulse for each 1° of prism or image rotation. The pulse signals are fed to a countr 61 which provides cumulative count numbers to a later to be described logic and control system 62 which also is provided withthe encoder signals. As will become apparent later, the count numbers serve as displacement signals indicative of the progressive cumulative change in angular displacement of the image from its initial reference position.

In order to more easily accommodate a variety of different sized parts 12, it is desirable, but not mandatory, that the vision system 18 be configured for varying the magnification or size of the image projected onto mask 20. For this purpose, the illustrated vision system 18 includes an optional multi-element, variable magnification, zoom lens 63 located on axis 44 between prism 42 and mask 20.

The mask 20 serves as a reference pattern located in the image plane 46 and onto which the rotating image is projected for providing a unique signal indicative of when during the course of image rotation the image is in the desired orientation.

In the illustrated embodiment, mask 20 is a negative image transparency photograph of the part 12 disposed on surface 34 of receptacle 22 in its desired angular orientation. Preferably, the mask 20 is generated by locating a negative transparency film unit at the image plane 46 and exposing it to an image of a properly orientated part 12 projected thereon to by prism 42 located at its angular reference position. Using the optical portion of vision system 18 to create mask 20 advantageously assures that there will be a high degree of correlation between the mask representation of the part and the projected image thereof.

Assume for the moment part 12 has a relativly dark tone and is much less light reflective than the surface 34 on which it is supported. In the positive image formed by prism 42, the part will appear to be much darker than the supporting surface 34 surrounding it. Therefore, in the negative mask 20, the photographic image of the part 12 is relatively light and defines a light transmissive window or aperture 64, in the shape of part 12, which is surrounded by a much denser or light blocking portion 66 of the mask that is the negative image of the surrounding surface 34.

Vision system 18 detects the relative angular orientations of the image and mask 20 by monitoring or sensing the amount or amplitude of image bearing light passing through aperture 64 with a light sensing assembly 68 positioned behind mask 20.

When the image projected onto mask 20 is rotated to an angular position wherein it coincides with or matches the mask, a minimum amount of image bearing light passes through aperture 64. This is because aperture 64 is completely filled with relatively low intensity light reflected from the registered part 12 while the higher intensity light reflected from surface 34 falls on and is blocked by the denser portion 66 of mask 20. That is, if one were to assume a position behind mask 20 and looked through aperture 64 one would see only the dark registered part and none of the more light reflective surface 34 as is diagrammatically shown in FIG. 4. However, as the image rotates out of its matching relation to the mask, as shown on FIG. 5, the less light reflective part 12 is no longer in complete registration with aperture 64 and one would see both a portion of the part 12 and some of the surface 34 surrounding it. Therefore, the image bearing light falling on aperture 64 will be of higher amplitude than when the image matches the mask 20.

In this configuration, mask 20 serves as a spatial filter which modulates the amplitude of the image bearing light in accordance with the angular orientation of the rotating image and passes a minimum amount of light through aperture 64 when the image matches or coincides with mask 20. The modulation effect is shown in FIG. 6 which is a graphical representation showing the variation in the amplitude of image bearing light passing through aperture 64 during the course of a 360° rotation of the image and wherein the part is angularly disposed in receptacle 22 such that the image will match the mask 20 at a cumulative angular displacement of approximately 270° from the initial reference position of the image.

At the start of the image rotation cycle, the image does not match the mask 20 so that image bearing light falling on aperture 64 is of relatively high amplitude because it includes components of both the low intensity light reflected from a portion of the part 12 that is imaged on aperture 64 and the higher intensity light reflected from the surrounding support surface 34. Because the proportions of part and surface components of the image falling on aperture 64 will change in response to image rotation, the amplitude will vary somewhat, the extent of which depends on the unique geometry of the particular part. However, the amplitude will remain at a relatively high average until the image approaches the matching position which results in aperture 64 being predominantly filled with the image of part 12 which causes the amplitude to drop off significantly and reach the minimum when the image coincides with the mask. As the image rotates past the matching position, portions of surface 34 are once again imaged on aperture 64 and the amplitude increases once again to a fairly high level. Thus, mask 20 modulates the image bearing light and provides a unique indication, i.e. a minimum amount of light transmission through aperture 64, when the rotating image coincides with the mask 20 which depicts part 12 in the desired orientation.

In the illustrated embodiment, the light sensing assembly 68 for measuring the amount of light passing through mask aperture 64 includes a light integrating sphere 70 having an entrance opening 72 aligned with aperture 64. Light passing through aperture 64 enters sphere 70 and undergoes multiple reflections from its interior surface thereby integrating the light which is sensed by a photodetector (not shown) mounted on the interior surface of the sphere. The photodetector in turn provides a voltage output signal that is proportional to the amount of light falling on it and feeds this signal, over a detector output line 74, to an amplifier 76 which amplifies the signal and feeds it to the logic and control system 62.

As an alternative to the integrating sphere assembly 68, the means for sensing light passing through aperture 64 may take the form of a large area photodetector or a matrix array of individual photodetectors used in conjunction with a summing or integrating circuit to provide a signal indicative of the amount of light transmitted through aperture 64.

In the illustrated embodiment, the vision system 18 is positioned above and off to one side of receptacle 22 so its view, along axis 44, into the interior of the receptacle 22 is oblique, rather than a direct overhead view parallel to axis 26, to provide clearance for movement of the robotic arm 14 into and out receptacle 22 which is preferably illuminated by a lamp 77 to enhance the contrast of the image formed by prism 42. However, there is nothing to preclude mounting vision system 18 directly over receptacle 22 so tat it has a direct view thereinto along or parallel to axis 26 as long as sufficient clearance is provided for the motion of the robotic arm 14.

Figures 7, 8:
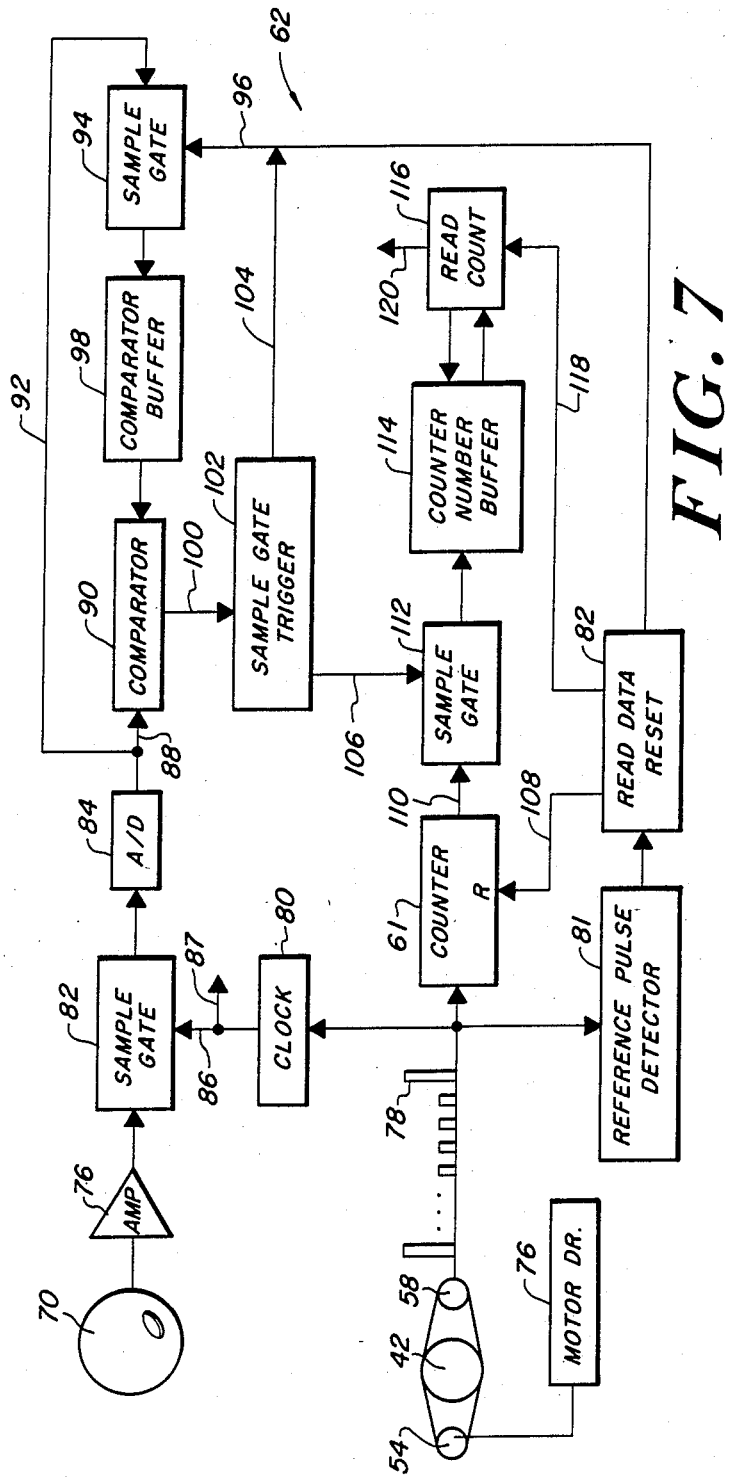
FIG. 7 is a functional block diagram of a logic and control system forming part of the angular deviation determining apparatus.
FIG. 8 is a functional block diagram of an automated part-handling system incorporating the angular deviation determining apparatus.

With reference to FIG. 7, the function of the logic and control system 62, shown in block diagram form, is to process the signals from the light sensing system 68 and the counter 61 and provide an output signal, which may be fed either to the robotic device or the receptacle assembly 16, indicative of the cumulative angular displacement of the image from its initial reference position at which the image coincides with the mask 20. The cumulative angular displacement is, of course, the angular deviation of the randomly angularly oriented part from its desired angular orientation.

During operation of the vision system 18, the prism 42 is continuously rotatably driven to minimize the time it takes to make the determination of angular deviation. Typically prism 42 would be rotated in the range of 300 to 600 RPM to provide an image rotation cycle having a duration in the range of 50 to 100 milliseconds.

In the illustrated embodiment, the prism drive motor 54 is operated by a motor drive unit 76 and in response to rotation of prism 42, encoder 58 is rotatably driven to generate its output signal pulses. In addition to being directly fed into counter 61 the encoder signals are utilized by system 62 to control timing and certain data acquisition and reset functions which will become apparent later.

The encoder 58 is configured to provide a sequence of pulses which begins with a reference pulse 78 indicative of when the prism 42 is at a predetermined reference location that determines the initial reference position of the image. The reference pulse 78 may be of a higher value or of opposite polarity to distinguish it from the following normal pulse signals. Because the image rotates twice as fast as the prism 42, encoder 58 is configured to provide a reference pulse 78 at each 180° of prism rotation to delineate 360° of image rotation.

The encoder signals are fed to and drive a system clock 80 which provides the necessary timing signals for various other components in system 62. In this manner, system 62 operates in synchronization with image rotation. The encoder signals are also fed to a reference pulse detector 81 which is configured to sense the higher level or opposite polarity reference pulse 78 and trigger the operation of a read data and reset circuit 82, the function of which will be described later.

The voltage signals from amplifier 76, indicative of the amount of light transmitted through aperture 64 are fed to a sample gate 83 which selectively feeds the signals therethrough to an analog to digital converter 84 in response to each successive gate control signal applied to gate 83 from clock 80 over gate control line 86. The clock output is also fed to other components of system 62 over a representative timing signal line 87.

Converter 84 converts the analog signals to a binary number indicative of the light level value and feeds the digitized signal over line 88 to one input terminal of a comparator 90. The output from converter 84 is also fed over line 92 to the input of a sample gate 94 which is responsive to gate control signals applied to line 96 for feeding the digitized light level signals to a comparator storage buffer 98 which feeds the stored information to the other input terminal of comparator 90.

Comparator 90 is configured to compare the light level value provided from converter 84 with the value stored in buffer 98. If the former value is lower than the latter value, comparator 90 provides an output signal over line 100 to a sample gate trigger circuit 102 which responds by providing gate control output signals over lines 104 and 106. On the other hand, if the value provided to comparator 90 from converter 84 is larger than the value stored in buffer 98 then comparator 90 does not provide the output signal for acutating trigger circuit 102.

The gate control signal on line 104 is fed over line 96 to sample gate 94 which conducts or opens and feeds the current lower value signal from converter 84 on line 92 into the buffer 98 to replace the previously stored higher value therein.

In this manner, the lowest current light level value encountered during a succession of comparisons is retained in buffer 98 for subsequent comparison. That is, each successive lower light level value encountered during a 360° image rotation cycle is retained in buffer 98 for comparison with the next light level value provided from converter 84.

The occurrence of a reference pulse 78 from encoder 58 marks the beginning of a 360° image rotation cycle. In order to initialize the comparison process, it is necessary that comparator buffer 98 have a light level value therein for comparison with the first light level value provided from converter 84. In the illustrated embodiment, when detector 81 senses the leading edge of reference pulse 78 it actuates circuit 82 which provides a reset signal over line 96 to gate 94. This opens gate 94 and causes the first light level value in the sequence carried on line 92 to be stored in comparator buffer 98. Thus in the first comparison operation, the first light level value is compared to itself and there is no ouput over line 100. This initialization step results in the first light level value being retained in buffer 98 for comparison with the next successive light level value provided from converter 84.

System 62 determines angular deviation by correlating the minimum light level value reading that occurs during the course of the 360° image rotation with its corresponding cumulative count number which is indicative of the cumulative angular displacement of the image from the initial reference position when the image coincides with the mask 20.

The counter 61 receives pulse signals directly from the rotating encoder 58. As noted earlier, when pulse detector 81 detects the leading edge of the reference pulse 78 it triggers circuit 82 which also provides a reset signal over line 108 to a counter reset terminal thereby setting the counter 61 to zero at the beginning of an image rotation cycle. Counter 61 counts the successive encoder pulses and provides a cumulative count number signal over output line 110 to the input of a sample gate 112 which provides the current cumulative count number to a count number buffer 114 when gate 112 receives a gate control pulse signal from trigger circuit 102 over line 106. Thus, when comparator 90 determines that the current light level value provided from converter 84 is lower than the value stored in the buffer 98 it acutates the trigger circuit 102 which in turn opens gates 94 and 112 to place the current minimum light level value in comparator buffer 98 and its corresponding cumulative count number in buffer 114.

At the end of the 360° image rotation cycle, the cumulative count number in buffer 114 is read and stored in a read and hold circuit 116 that is actuated by a read data signal provided by circuit 82 in response to its actuation by detector 81 sensing the leading edge of the reference pulse 78 which marks the beginning of the next image rotation cycle. The stored count number, which is indicative of angular deviation, is available over output line 120 for use in either rotating receptacle 22 to move the part 12 to the desired angular orientation, or adjusting the robotic arm 14 to accommodate the angular deviation.

In use, the receptacle assembly 16 and the vision system 18 are adapted to be integrated with the part feeding device 17 and robotic arm 14 to form an automated part handling system which operates under the control of a programmable controller or computer based control system 122 as shown in FIG. 8.

In operation, system 122 initiates a part-handling cycle by actuating the part feeding device 17 which is operative to deposit a part 12 into receptacle 22. Then, the control system 122 actuates the vibratory source in the base unit 24 of assembly 16 to effect vibration of receptacle 22, for a duration in the range of 0.5 to 1.5 seconds, to position the part 12 in the designated area 36 of the horizontal plane 38.

Following the positioning of part 12, the control system 122 interacts with the vision system 18 to determine the angular deviation of the part from the desired angular orientation.

As noted earlier, the prism 42 is adapted to be rotated on a continuous basis. Typically, control system 122 would be configured to actuate the prism motor drive unit 76 when control system 122 is first turned on.

For each 180° of prism rotation, the image of the part projected onto the mask 20 rotates through 360°. In response to each 360° image rotation cycle, the logic and control system 62 processes the light level signals and count number signals and provides the count number over output line 120 indicative of the cumulative angular displacement of the image from its initial reference position at which the image matches the mask 20. After control system 122 terminates the vibration of receptacle 22, it is adapted to read the count number provided from circuit 116 over line 120 and derived therefrom the deviation angle $\theta_d$.

If the part handling system is designed to effect physical rotation of part 12 in receptacle 22 then control system 122 would actuate the stepper motor 28 of assembly 16 and provide it with the appropriate number of drive pulses to rotate receptacle 22 through the deviation angle $\theta_d$ thereby locating the part at the desired angular orientation for the robotic arm 14 which is adapted to be actuated by control system 122 following rotation of receptacle 122.

On the other hand, if the part handling system is designed to use the angular deviation information to adjust the angular orientation of robotic arm 14, then control system 122 would feed the information to the robot's operating program to effect such an adjustment.

Alternatively, the part handling system could be designed to utilize both part rotation and robotic arm adjustment in combination to compensate for the angular deviation.

The apparatus 10, embodying the present invention, may be broadly described as including means for sequentially supporting a plurality of similar articles in a given horizontal alignment. In each instance, such articles are randomly angularly oriented on the supporting means about a vertical axis passing therethrough.

The prism 42 serves as optical means for viewing such a supported article along a given optical axis and for forming an image thereof. Prism 42 is of the image inverting type which effects a rotation of the image in response to selectively rotating the prism 42 angularly about the optical axis from an initial reference position.

Additionally, apparatus 10 includes means for detecting, as the optical means are being driven by the rotating means, when the optical means has been angularly displaced from its initial reference position about the optical axis such that the image of the viewed article is aligned in a preselected manner.

Also, apparatus 10 includes means responsive to the detecting means for generating a signal indicative of the then angular displacement of the optical means from its initial reference position. These signals are produced sequentially in the course of handling a plurality of similar articles and are available to control the operation of other devices that are functionally associated with such articles, such as the receptacle 22 or the robotic arm 14, to achieve a similar result with each such article while accommodating the initial random angular orientation of such articles.

In FIGS. 2 and 3, the illustrated part 12 is shown in its proper rightside up state for pick up by the robotic arm 14 with its flat irregular shaped base section 124 lowermost and an upstanding tab 126, formed on one end of base section 124, facing upwardly. Because part 12 is asymmetrical, there is the possibility that it may be inadvertently deposited into receptacle 22 in a manner whereby it assumes an inverted or upside down equilibrium position.

The particular shape of any given assymmetrical part 12 will determine how many different equilibrium positions or stabilized states it may assume in receptacle 22. Some parts will have only two stablized states, rightside up and upside down. Other parts having more complex shapes possibly may assume three or four different equilibrium positions.

In such cases, it would be desirable for the vision system 18 to have the capability of recognizing that the part is not in a proper state and, in response to such recognition, providing an appropriate signal to the control system 122 to invoke a remedial action program that would specify an alternative angular orientation which would allow the robotic arm 14 to grasp the part and either discard it or reorient it to the proper state for transfer to the product assembly.

Figure 9:
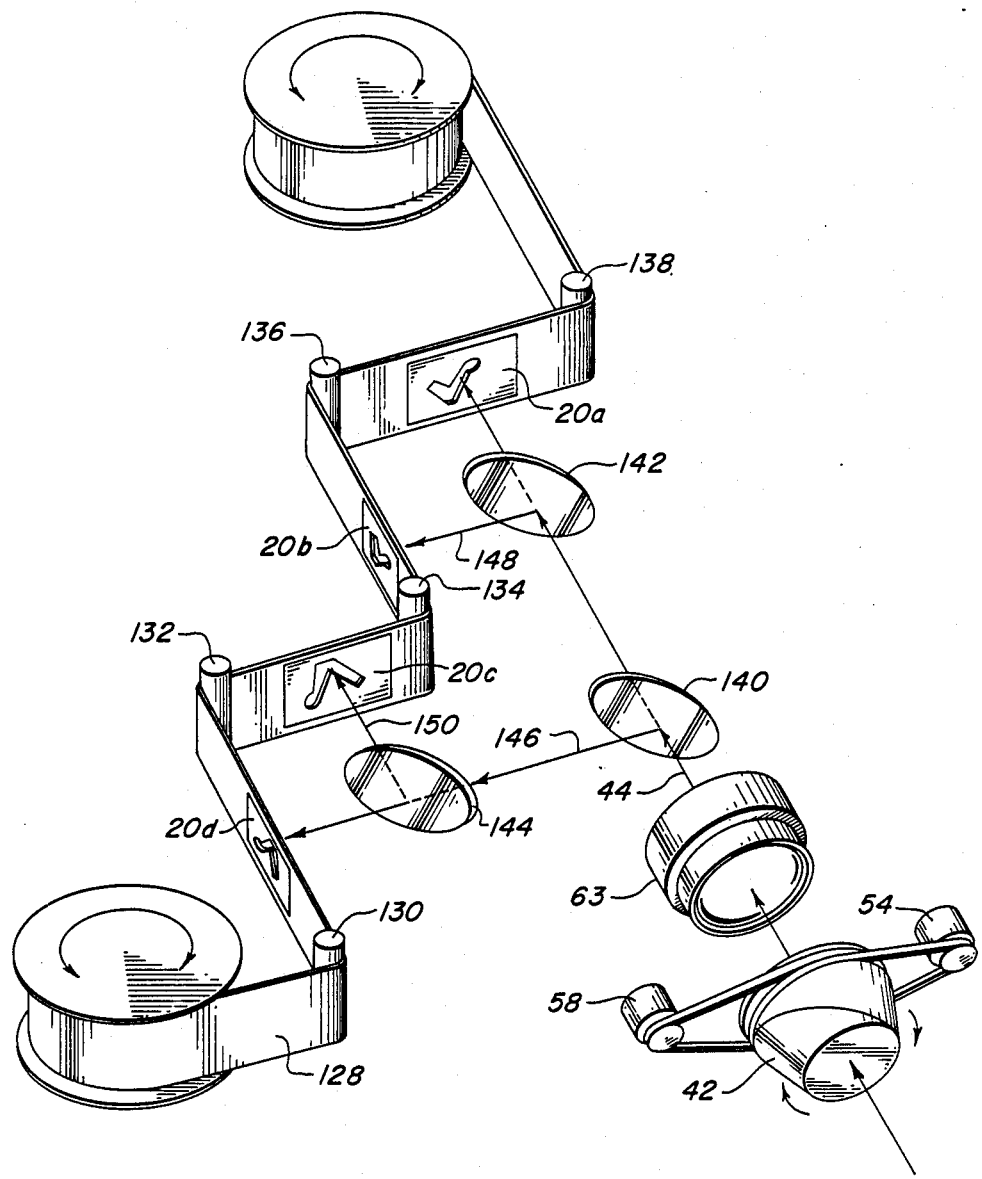
FIG. 9 is a diagrammatic perspective view of a multiple mask arrangement suitable for use in an alternative embodiment of the angular deviation determining apparatus.

As best shown in FIG. 9, the vision system 18 may be modified to recognize the various equilibrium positions by providing it with a plurality of different masks 20, one for each possible equilibrium position; simultaneously projecting the rotating image onto each of the different masks 20; and identifying which state the part is in by determining which mask 20 transmits the minimum amount of light therethrough.

In FIG. 9 the vision system 18 is configured for use with a part that may assume four different equilibrium positions. As such, it includes an elongated film strip 128 that has four different negative image masks 20a, 20b, 20c, and 20d formed thereon, each representing the part in a different one of its four equilibrium positions.

The film strip 128 is threaded around stationary guideposts 130, 132, 134, 136 and 138 which are arranged so that the film strip 128 assumes a staircase configuration locating the individual masks at a succession of corresponding image planes, each of which is offset from the preceeding image plane by 90°.

In order to project the rotating image provided by prism 42 onto each of the masks 20a-20d, the vision system further includes additional optical means in the form of three 50/50 pellicle beamsplitters 140, 142 and 144 disposed between the zoom lens 63 and the corresponding masks 20a-20d.

The first beamsplitter 140 is disposed at 45° to the optical axis 44 for transmitting a portion of the image bearing light beam to the second beamsplitter 142 on axis 144 and reflecting another portion of the beam along an optical path 146, at 90° to axis 44, to the third beamsplitter 144.

The beam of light incident on beamsplitter 142 is divided into a transmitted portion that is projected onto the first mask 20a aligned with axis 44 and a reflected portion that is projected along an optical path 148, at 90° to axis 44, onto the second mask 20b.

The third beamsplitter 144 is disposed at 45° to optical path 146 and divides the reflected light beam provided from beamsplitter 140 into a transmitted portion that is projected onto the fourth mask 20d and a reflected portion, transmitted along optical path 150 at 90° to optical path 146, for projecting the image onto the third mask 20c.

In this manner, the rotating image provided by prism 42 is projected simultaneously onto each of the four masks 20a-20d. Although not shown on the drawings, a photodetector, such as an integrating sphere or a large area photocell, is provided behind each of the four masks for measuring the amount of light transmitted therethrough as a function of image rotation. In turn, the light level signals are fed to four separate corresponding logic and control circuits 62 which also receive the signal pulses from encoder 58 and the output from counter 61.

In operation, the rotating image of the part 12 disposed in receptacle 22 in one of its four stable states is projected onto the masks 20a-20d. During the course of a 360° image rotation, the image will exactly match only the mask corresponding to the state of the part and the minimum amount of light transmitted through this mask will be lower than the minimum amounts transmitted through the other three masks.

To determine the state of the part in receptacle 22, the vision system 18 would additionally include a comparator for receiving and comparing the minimum light value stored in the respective comparator buffers 98 of each circuit 62 and providing an output signal indicative of which of the four masks transmitts the minimum amount of light to the control system 122. Based on this input, the control system 122 will invoke an appropriate program to handle the part. If the part is in its proper orientation for pick up, control system 122 will actuate the normal program to either rotate the receptacle 22 or adjust the robotic arm for the given angular deviation. If the part is in one of the other three states, control system 122 will invoke a remedial action program which will provide an alternative angular orientation of the part which will allow it to be successfully grasped by the robotic arm 14.

Because certain changes and modifications may be made in the apparatus embodying the present invention without departing from the spirit and scope of the invention involved herein, it is intended that all matter contained in the above description or shown in the accompanying drawings be interpreted as being illustrative and not in a limiting sense.

What is claimed is:

1. Apparatus for determining the angular deviation with respect to a reference axis of a randomly angularly oriented article in a given plane from a desired angular orientation, said apparatus comprising:
   means for supporting such a randomly angularly oriented article in the given plane;
   optical means for forming an image of the supported article at an image plane, said optical means having an optical axis and being mounted for rotation thereabout through a given angular displacement from a given reference location to effect a 360° rotation of said image from an initial position;
   means for rotatably driving said optical means through said given angular displacement;
   means responsive to rotation of said optical means for providing displacement signals indicative of the progressive cummulative change in angular displacement of said image from its said initial position;
   means, including a reference pattern located in said image plane and onto which said rotating image is projected, for providing a signal indicative of when during the course of image rotation said rotating image is in the desired orientation, said pattern being representative of the article in its desired angular orientation; and
   means responsive to said displacement signals and said desired orientation signal for providing an angular deviation signal indicative of the cumulative angular displacement of said image from its said initial position at the occurrence of said desired orientation signal.

2. The apparatus of claim 1 wherein said optical means includes an image inverting prism.

3. The apparatus of claim 2 wherein said prism is a Pechan prism.

4. The apparatus of claim 1 wherein said pattern serves to modulate image bearing light projected thereonto by said optical means as a function of the angular orientation of said image with respect to said desired orientation.

5. The apparatus of claim 4 wherein said pattern is a negative image representation of the article in its said desired orientation.

6. Apparatus for viewing an article presented in a given plane such that it has a random angular orientation with respect to a reference axis, and for determining the angular deviation of the randomly angularly oriented article from a desired angular orientation, said apparatus comprising;
   means for supporting such a randomly angularly oriented article in the given plane;
   optical means for forming an image of the supported article at an image plane, said optical means having an optical axis and being mounted for rotation thereabout through a given angular displacement from a reference location to effect a 360° rotation of said image from an initial position;
   means for rotatably driving said optical means through said given angular displacement;
   means responsive to rotation of said optical means for providing displacement signals indicative of the progressive cumulative change in angular displacement of said image from its said initial position;
   a reference pattern representative of the article in its desired angular orientation located at said image plane and onto which image bearing light is projected by said optical means for modulating the amount of light transmitted through said pattern in accordance with the angular orientation of said rotating image, said pattern being configured for transmitting a minimum amount of light therethrough when the angular orientation of said rotating image coincides with the desired angular orientation;
   means for detecting said light transmitted through said pattern during image rotation and for providing light level signals indicative of the amount of said transmitted light; and
   means for processing said displacement signals and said light level signals to provide an angular deviation signal indicative of the cumulative angular displacement of said image from its said initial position at the occurrence of a light level signal indicative of a minimum amount of light transmitted through said pattern.

7. The apparatus of claim 6 wherein said optical means includes an image inverting prism.

8. The apparatus of claim 7 wherein said prism is a Pechan prism.

9. The apparatus of claim 6 wherein said pattern is a mask including a negative image representative of the article supported in the desired angular orientation.

10. The apparatus of claim 9 wherein said negative image representation is a light transmissive aperture having the shape of the article.

11. The apparatus of claim 6 wherein said means for providing said displacement signals includes a rotatable signal generator that is coupled to and rotatably driven by said optical means.

12. The apparatus of claim 6 wherein said pattern is a mask formed by a negative image transparency photograph of the article supported on said support means in the desired orientation.

13. The apparatus of claim 12 wherein said photograph is made by utilizing said optical means to project an image of the supported article onto a negative transparency film unit located at said image plane.

14. The apparatus of claim 12 further including a variable magnification lens located between said optical means and said mask for varying the size of the image projected onto said mask.

15. The apparatus of claim 6 wherein said optical means is configured to be rotated through a give angular displacement of 180° to effect a 360° rotation of said image.

16. The apparatus of claim 6 wherein the article is of the type which may assume a plurality of different stabilized states on said supporting means and said apparatus includes a plurality of different reference patterns, each corresponding to one of said different states, means for simultaneously projecting said image onto each of said different patterns, means for detecting image bearing light transmitted through each of said patterns during image rotation and for providing light level signals indicative of the amount of said transmitted light, and means for processing said light level signals and determining which of said patterns transmits a minimum amount of light therethrough to identify the stabilized state of the article.

* * * * *